US010062282B2

(12) United States Patent
Edakunni et al.

(10) Patent No.: US 10,062,282 B2
(45) Date of Patent: Aug. 28, 2018

(54) METHOD AND SYSTEM FOR DETERMINING EFFECT OF WEATHER CONDITIONS ON TRANSPORTATION NETWORKS

(71) Applicant: XEROX CORPORATION, Norwalk, CT (US)

(72) Inventors: Narayanan Unny Edakunni, Bangalore (IN); Sharmistha Jat, Pune (IN)

(73) Assignee: Conduent Business Services, LLC, Dallas, TX (US)

( * ) Notice: Subject to any disclaimer, the term of this patent is extended or adjusted under 35 U.S.C. 154(b) by 49 days.

(21) Appl. No.: 14/687,024

(22) Filed: Apr. 15, 2015

(65) Prior Publication Data
US 2016/0307446 A1    Oct. 20, 2016

(51) Int. Cl.
  *G08G 1/01*  (2006.01)
  *G08G 1/13*  (2006.01)
  (Continued)

(52) U.S. Cl.
  CPC .......... *G08G 1/13* (2013.01); *G01C 21/3691* (2013.01); *G01C 21/3694* (2013.01);
  (Continued)

(58) Field of Classification Search
  CPC .... G08G 1/13; G08G 1/0125; G01C 21/3694; G01C 21/3691; H04B 1/3822; H04W 4/021
  See application file for complete search history.

(56) References Cited

U.S. PATENT DOCUMENTS 6,317,686 B1    11/2001  Ran
8,880,330 B2 *  11/2014  Gooding ............ G01C 21/3407
                                                340/905
(Continued)

OTHER PUBLICATIONS

Vlahogianni, Eleni I., and Matthew G. Karlaftis. "Comparing traffic flow time-series under fine and adverse weather conditions using recurrence-based complexity measures." Nonlinear Dynamics 69.4 (2012): 1949-1963.*

(Continued)

*Primary Examiner* — Alan D Hutchinson
(74) *Attorney, Agent, or Firm* — Jones Robb, PLLC

(57) ABSTRACT

The disclosed embodiments illustrate methods and systems for determining an effect of a weather condition on a transportation network. The method includes receiving one or more parameters of the weather condition in a geographical area for a predetermined time-period. The method further includes determining a delay from a scheduled time of arrival of one or more vehicles, associated with the transportation network, at a location from one or more locations, in the transportation network, in the geographical area for the predetermined time-period. Thereafter, a sensitivity of the one or more locations to the weather condition of the geographical area is determined by correlating the delay with the one or more parameters of the weather condition. Further, the sensitivity of the one or more locations is displayed, through a user interface, as a first layer overlaid on a map of the geographical area.

19 Claims, 9 Drawing Sheets

(51) Int. Cl.
  *H04W 4/021* (2018.01)
  *G01C 21/36* (2006.01)
  *G08G 1/0968* (2006.01)

(52) U.S. Cl.
  CPC . *G08G 1/096816* (2013.01); *G08G 1/096844* (2013.01); *H04W 4/021* (2013.01)

(56) References Cited

U.S. PATENT DOCUMENTS

| | | | | |
|---|---|---|---|---|
| 2004/0039517 | A1* | 2/2004 | Biesinger | G08G 1/01 701/117 |
| 2004/0225437 | A1* | 11/2004 | Endo | G01C 21/34 701/415 |
| 2004/0243299 | A1* | 12/2004 | Scaer | G08G 1/202 701/522 |
| 2007/0208497 | A1* | 9/2007 | Downs | G08G 1/0104 701/117 |
| 2009/0037100 | A1* | 2/2009 | Fujiwara | G01C 21/3492 701/533 |
| 2009/0210388 | A1 | 8/2009 | Elson et al. | |
| 2014/0039986 | A1* | 2/2014 | Handley | G06Q 10/0639 705/7.42 |
| 2014/0040166 | A1 | 2/2014 | Handley | |
| 2014/0222321 | A1 | 8/2014 | Petty et al. | |
| 2015/0228193 | A1* | 8/2015 | Bick | G01C 21/3423 340/990 |

OTHER PUBLICATIONS

H.J.van Zuylen Huizhao Tu, J.W.C. van Lint. The impact of adverse weather on travel time variability of freeway corridors. Transportation Research Board, 2007.

Adel Bolbol Ioannis Tsapakis, Tao Cheng. Impact of weather conditions on macroscopic urban travel times. Journal of Transport Geography, 2013.

Lalit Nookala. Weather impact on trac conditions and travel time prediction. Master's thesis, University of Minnesota Duluth, 2006.

* cited by examiner

METHOD AND SYSTEM FOR DETERMINING EFFECT OF WEATHER CONDITIONS ON TRANSPORTATION NETWORKS

TECHNICAL FIELD

The presently disclosed embodiments are related, in general, to transportation networks. More particularly, the presently disclosed embodiments are related to methods and systems for determining an effect of a weather condition on a transportation network.

BACKGROUND

Transportation networks are lifelines of trade, commerce, and livelihood in most parts of the world. Thus, operation efficiency and timeliness of the transportation network (e.g., public transit system) of a geographical area may be vital for the economic development of the geographical area. However, the weather conditions prevalent in the geographical area may influence the timeliness of the transportation network. For example, the timeliness of a public transit system, e.g., bus service, may deteriorate on rainy days due to water logging on streets and poor visibility, etc. Hence, it may be advantageous to determine an effect of the weather condition on the transportation network of the geographical area.

SUMMARY

According to embodiments illustrated herein, there is provided a system for determining an effect of a weather condition on a transportation network. The system includes a transceiver configured to receive one or more parameters of a weather condition in a geographical area for a predetermined time-period. The system further includes one or more processors configured to determine a delay from a scheduled time of arrival of one or more vehicles, associated with the transportation network, at a location from one or more locations, in the transportation network, in the geographical area for the predetermined time-period. The one or more processors are further configured to determine a sensitivity of the one or more locations to the weather condition of the geographical area by correlating the delay with the one or more parameters of the weather condition. In addition, the one or more processors are configured to display, through a user interface, the sensitivity of the one or more locations as a first layer overlaid on a map of the geographical area.

According to embodiments illustrated herein, there is provided a method for determining an effect of a weather condition on a transportation network. The method includes receiving, by a transceiver, one or more parameters of a weather condition in a geographical area for a predetermined time-period. The method further includes determining, by one or more processors, a delay from a scheduled time of arrival of one or more vehicles, associated with the transportation network, at a location from one or more locations, in the transportation network, in the geographical area for the predetermined time-period. The one or more processors further determine a sensitivity of the one or more locations to the weather condition of the geographical area by correlating the delay with the one or more parameters of the weather condition. Thereafter, the one or more processors display, through a user interface, by the one or more processors, the sensitivity of the one or more locations as a first layer overlaid on a map of the geographical area.

According to embodiments illustrated herein, there is provided a method for recommending a route from one or more routes between a first location and a second location in a geographical area. The method includes receiving, by a transceiver, one or more parameters of a past weather condition in a geographical area during a predetermined time-period. Further, the method includes determining, by one or more processors, a dwell time of one or more vehicles in each of the one or more routes during the predetermined time-period. The one or more processors further determine a sensitivity of the one or more routes to the past weather condition in the geographical area by correlating the dwell time with the one or more parameters of the past weather condition. Thereafter, the one or more processors recommend the route based on the sensitivity of the route and a current weather condition in the geographical area. Further, the one or more processors display the route on a map of the geographical area through a user interface of a computing device.

According to embodiments illustrated herein, there is provided a computer program product for use with a computing device. The computer program product comprises a non-transitory computer readable medium storing a computer program code for determining an effect of a weather condition on a transportation network. The computer program code is executable by one or more processors in the computing device to receive, by a transceiver, one or more parameters of a weather condition in a geographical area for a predetermined time-period. The computer program code is further executable by the one or more processors to determine a delay from a scheduled time of arrival of one or more vehicles, associated with the transportation network, at a location from one or more locations, in the transportation network, in the geographical area for the predetermined time-period. Thereafter, a sensitivity of the one or more locations to the weather condition of the geographical area is determined by correlating the delay with the one or more parameters of the weather condition. Further, the sensitivity of the one or more locations is displayed, through a user interface, as a first layer overlaid on a map of the geographical area.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
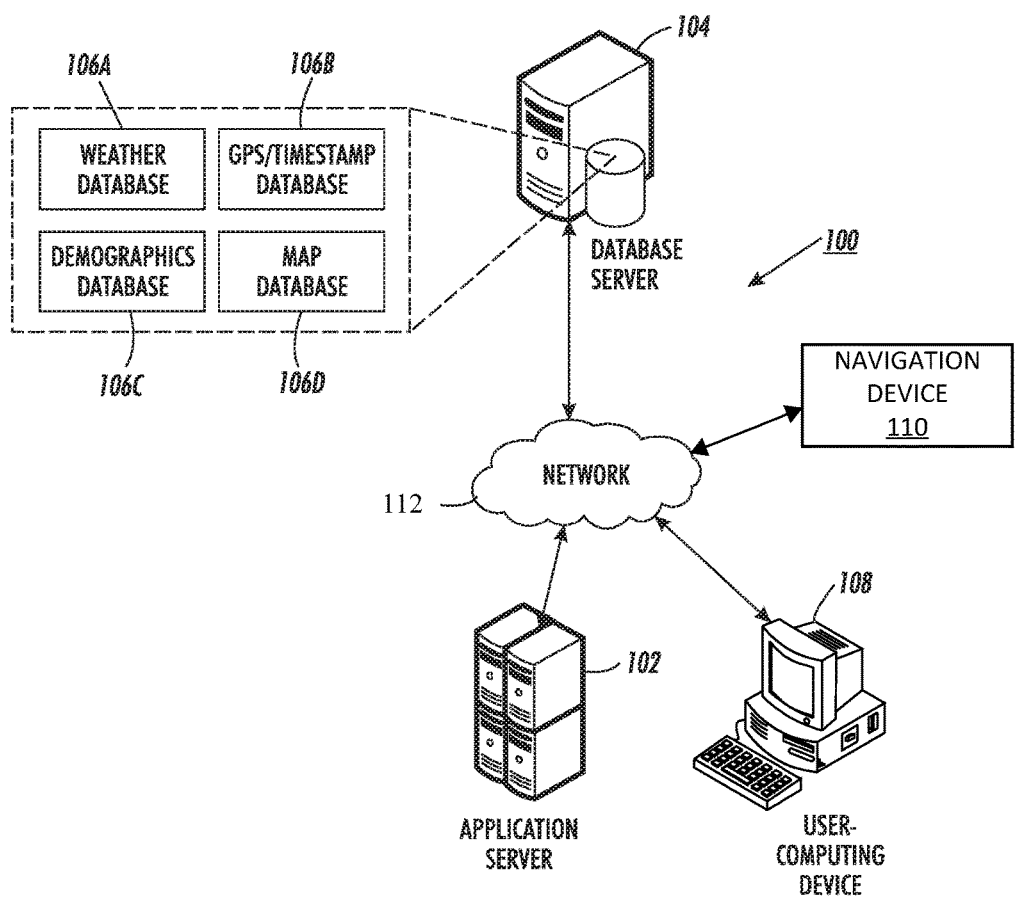
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad®, and Samsung Galaxy Tab®), and the like.

A "transportation network" refers to a network or an infrastructure that facilitates commutation between one or more locations in a geographical area using one or more means of transport. In an embodiment, the one or more means of transport may include public transport vehicles and private transport vehicles.

A "public transit system" refers to a transportation network available for use by a public of a geographical area on a shared basis such that multiple passengers may share each vehicle of the transportation network. Examples of the one or more vehicles in the public transit system may include, but are not limited to, one or more buses, one or more trams, one or more trains, and one or more metros.

A "geographical area" refers to a region, a territory, or an area encompassing at least one of, but not limited to, a country, a state, a city, a town, a district, a suburb, a village, or a county. In an embodiment, a government/area planning organization may predefine the boundary of the geographical area.

A "location" refers to a distinct place or a site within the geographical area. In an embodiment, the one or more vehicles may commute between the one or more locations. In a scenario where the transportation network is a public transit system, in an embodiment, the location may correspond to at least one of a bus stop, a tramway station, a train station, or a metro station in the geographical area.

A "route" refers to a path connecting two locations within the geographical area.

A "delay" refers to a difference between an actual time of arrival/departure of a vehicle at a location from a scheduled time of arrival/departure of the vehicle at the location. In an embodiment, the delay associated with a route may correspond to a difference between an actual travel time on the route from an expected travel time on the route.

A "dwell time" refers to a stoppage time of a vehicle while travelling on a route.

A "sensitivity" refers to a measure of correlation of a first quantity to a change in value in a second quantity. In an embodiment, a positive value of correlation may be indicative of the first quantity being positively correlated to the second quantity.

A "weather condition" refers to a state of environment at a particular geographical area at a particular time instance. In an embodiment, the weather condition at the geographical area may be quantified in terms of one or more parameters such as, but not limited to, rainfall precipitation, snowfall precipitation, temperature, wind speed, air pressure.

A "layer" refers to representation of data pertaining to various locations in a geographical area over a map of the geographical area.

A "map" refers to a graphical representation of the relative positions of the one or more locations in a geographical area. In an embodiment, the map may be according to a scale, which may represent the actual physical distances between the one or more locations in the geographical area.

A "demographic parameters" refer to information pertaining to individuals residing in a particular geographical area. In an embodiment, the demographic parameters may be representative of population dynamics of the geographical area. Examples of the demographic parameters may include, but are not limited to, a population distribution, an income distribution, one or more business districts/households, one or more city centers, and one or more suburbs of the geographical area.

FIG. 1 is a block diagram of a system environment 100, in which various embodiments can be implemented. The system environment 100 includes an application server 102, a database server 104, a user-computing device 108, a navigation device 110, and a network 112.

The application server 102 refers to a computing device including one or more processors and one or more memories. The one or more memories may include computer readable code that is executable by the one or more processors to perform predetermined operation. In an embodiment, the predetermined operation may include determining an effect of a weather condition in a geographical area on a transportation network of the geographical area. In an embodiment, each of one or more vehicles of the transportation network may have the navigation device 110 installed in the vehicle. The navigation device 110 may monitor Global Positioning System (GPS) co-ordinates of a location of the respective vehicles in real-time. Further, the navigation device 110 may timestamp the GPS co-ordinates of the location of the respective vehicles. In an embodiment, the application server 102 may receive the time-stamped GPS co-ordinates of the location of the one or more vehicles during a predetermined time-period from the navigation device 110 installed in the respective vehicles. In an embodiment, the application server 102 may store information pertaining to the GPS co-ordinates and the timestamps of the GPS co-ordinates, which are collected over the predetermined time-period, as a GPS/Timestamp Database 106b in the database server 104. Thereafter, in an embodiment, the application server 102 may determine a delay of each of the one or more vehicles at each of the one or more locations based on the information pertaining to the timestamped GPS co-ordinates of each of the one or more vehicles. In an embodiment, the delay of a vehicle at a location may correspond to a difference between an arrival/departure time of the vehicle at the location from a scheduled arrival/departure time of the vehicle at the location during a predefined time interval. In an embodiment, the delay at the location during predefined time interval may correspond to an average value of delay in arrival/departure time of all the vehicles passing through the location during the predefined time interval. In an embodiment, the application server 102 may store the delay values at each of the one or more locations as a Map Database 106d in the database server 104.

Further, in an embodiment, the application server 102 may receive one or more parameters of a weather condition in the geographical area in each predefined time interval (e.g., a day) during the predetermined time-period (e.g., a month). In an embodiment, the application server 102 may receive the one or more parameters of the weather condition from one or more sources such as, but not limited to, a Weather/Meteorological department of the geographical area, a news agency covering the geographical area, and so on. Examples of the one or more parameters of the weather condition include, but are not limited to, a snowfall precipitation, a rainfall precipitation, a temperature, a wind speed, or an air pressure. In an embodiment, the application server 102 may store the one or more parameters of the weather condition in each predefined time interval during the predetermined time-period as a Weather Database 106a in the database server 104. Thereafter, the application server 102 may determine a sensitivity of the one or more locations to the weather condition of the geographical area by correlating the delay of the one or more vehicles at each of the one or more locations during each predefined time interval with the one or more parameters of the weather condition during the respective predefined time intervals. Further, the application server 102 may retrieve information pertaining to a map of the geographical area from the Map Database 106d in the database server 104. Thereafter, the application server 102 may display the sensitivity of the one or more locations as a first layer overlaid on the map of the geographical area to a user through a user-interface. In an embodiment, the application server 102 may transmit the user-interface to the user-computing device 108, which may present the user-interface to the user on a display device of the user-computing device 108. An embodiment of the determination of the effect of the weather condition on the transportation network has been explained further in conjunction with FIG. 3. Further, an example of the user-interface displaying the map overlaid with the first layer (i.e., the sensitivities of the one or more locations) has been explained in conjunction with FIG. 6.

In addition, in an embodiment, the application server 102 may receive one or more demographic parameters associated with the geographical area for the predetermined time-period from one or more sources such as, but not limited to, a Population Census organization, a Municipal Corporation of the geographical area, or any other government/private agency collecting and maintaining such data. Examples of the one or more demographic parameters associated with the geographical area include, but are not limited to, a population distribution, an income distribution, one or more business districts/households, one or more city centers, and one or more suburbs of the geographical area. In an embodiment, the application server 102 may store the one or more demographic parameters as a Demographics Database 106c in the database server 104. Further, the application server 102 may display the one or more demographic parameters as a second layer overlaid on the first layer (i.e., the layer displaying the sensitivities of the delay of the one or more vehicles at each of the one or more locations) on the map of the geographical area to the user through the user-interface. An example of the user-interface displaying the map simultaneously overlaid with the first layer (i.e., the sensitivities of the one or more locations) and the second layer (i.e., the one or more demographic parameters) has been explained in conjunction with FIG. 7.

In addition, in an embodiment, the application server 102 may also be configured to recommend a route from one or more routes between a first location and a second location in the geographical area. In an embodiment, the application server 102 may recommend the route in response to a query received from at least one of the user-computing device 108 or the navigation device 110. To recommend the route, in an embodiment, the application server 102 may initially determine the one or more routes between the first location and the second location based on information pertaining to the one or more routes in the Map Database 106d. A person having ordinary skill in the art will understand that each of the one or more routes may be divided into one or more small segments or sub-routes. In an embodiment, the sub-routes may correspond to intermediate locations on a route that a vehicle may have to traverse through in order to reach the destination location. Thereafter, the application server 102 may determine an observed dwell time of each of the one or more vehicles in each of the one or more segments during each predefined time interval. In an embodiment, the application server 102 may determine the dwell time of each of the one or more vehicles based on the information pertaining to the timestamped GPS co-ordinations of the one or more vehicles during predefined time interval (stored in the GPS/Timestamp Database 106b). Thereafter, in an embodiment, the application server 102 may correlate the dwell time of the one or more vehicles in each segment with the one or more parameters of the weather condition during predefined time interval (stored in the Weather Database 106a). The application server 102 may determine a sensitivity of each segment to a past weather condition during each predefined time interval within the predetermined time-period based on the correlation of the dwell time with the one or more parameters of the weather condition. Thereafter, the application server 102 may determine the sensitivity of each of the one or more routes to the past weather condition based on the sensitivities of the individual segments within the respective routes to the past weather condition. For example, the application server 102 may determine the sensitivity of a route as the average of the sensitivities of the constituent segments within the route. An embodiment of the determination of the sensitivities of one or more routes between each pair of locations in the geographical area has been explained further in conjunction with FIG. 4.

Thereafter, the application server 102 may receive information pertaining to the current weather condition in the geographical area from one or more sources such as, but not limited to, a Weather/Meteorological department of the geographical area, a news agency covering the geographical area, and so on. In an embodiment, the application server 102 may store the information pertaining to the current weather condition in the geographical area in the Weather Database 106a. Based on the sensitivity of the one or more routes to the weather condition and the current weather condition in the geographical area, the application server 102 may recommend the route from the one or more routes between the first location and the second location. In an embodiment, the application server 102 may retrieve the map of the geographical area from the Map Database 106d and display the recommended route on the map. An embodiment of a method to recommend the route from the one or more routes between the first location and the second location has been explained in FIG. 5. Further, an example of the user-interface displaying the map with the recommended route to the user has been explained in conjunction with FIG. 8.

The application server 102 may be realized through various types of application servers such as, but not limited to, Java application server, .NET framework application server, and Base4 application server.

The database server 104 may refer to a device or a computer that stores at least the one or more parameters of the weather condition, the information pertaining to the time-stamped GPS co-ordinates collected from the one or more vehicles, the one or more demographic parameters of the geographical area, and the information pertaining to the map of the geographical area. In an embodiment, the database server 104 may maintain the Weather Database 106a to store the one or more parameters of the weather condition during each predefined time interval. Further, the database server 104 may maintain the GPS/Timestamp Database 106b to store the time-stamped GPS co-ordinates of the locations of the one or more vehicles during each predefined time interval. The database server 104 may maintain the Demographics Database 106c to store the one or more demographic parameters associated with the geographical area. Further, the database server 104 may maintain the Map Database 106d to store the information pertaining to the map of the geographical area, the delay and the sensitivity values determined for each location in the geographical area, and the dwell time and sensitivity values determined for each route in the geographical area. In an embodiment, the database server 104 may update each of the databases (i.e., 106a, 106b, 106c, 106d) at the end of each predefined time interval based on collected data related to the respective databases. In an embodiment, the database server 104 may receive a query from the application server 102 to extract/update the various databases, i.e., 106a, 106b, 106c, and 106d. The database server 104 may be realized through various technologies such as, but not limited to, Oracle®, IBM DB2®, Microsoft SQL Server®, Microsoft Access®, PostgreSQL®, MySQL® and SQLite®, and the like. In an embodiment, the application server 102 may connect to the database server 104 using one or more protocols such as, but not limited to, Open Database Connectivity (ODBC) protocol and Java Database Connectivity (JDBC) protocol.

A person with ordinary skill in the art would understand that the scope of the disclosure is not limited to the database server 104 as a separate entity. In an embodiment, the functionalities of the database server 104 can be integrated into the application server 102.

The user-computing device 108 refers to a computing device used by the user. In an embodiment, the user may correspond to an employee of an organization managing the transportation network or an employee of another organization providing consultation for managing the transportation network. In an embodiment, the user-computing device 108 may include one or more processors and one or more memories. The one or more memories may include computer readable code that is executable by the one or more processors to perform predetermined operation. In an embodiment, the predetermined operation may include displaying the map of the geographical area that includes the first layer (i.e., the sensitivities of the one or more locations) and the second layer (i.e., the one or more demographic parameters) overlaid on the map, through the user-interface on the display device of the user-computing device 108. Based on the map presented on the user-computing device 108, in an embodiment, the user may manage a schedule and a route associated with the one or more vehicles of the transportation network. For example, if a location is highly sensitive to weather delays, the user may deploy more vehicles to service that location. Further, the user may adjust the route of the one or more vehicles in such a manner that the one or more vehicles commute between the one or more locations of the transportation network using routes that are less sensitive to weather delays.

The user-computing device 108 may include a variety of computing devices such as, but not limited to, a laptop, a personal digital assistant (PDA), a tablet computer, a smartphone, a phablet, and the like.

A person skilled in the art would appreciate that the scope of the disclosure is not limited to the application server 102 and the user-computing device 108 as separate entities. In an embodiment, the application server 102 may be realized as an application hosted on or running on the user-computing device 108 without departing from the spirit of the disclosure.

The navigation device 110 refers to a computing device used by an individual driving or navigating the one or more vehicles. In an embodiment, the user-computing device 108 may include one or more processors and one or more memories. The one or more memories may include computer readable code that is executable by the one or more processors to perform predetermined operation. In an embodiment, the navigation device 110 may be installed on or inbuilt within the each of the one or more vehicles. In such a scenario, the navigation device 110 may include a GPS sensor, which may monitor the GPS co-ordinates of a current location of the vehicle. Further, the navigation device 110 may timestamp the GPS co-ordinates of the location of the vehicle. In an embodiment, the navigation device 110 may transmit the time-stamped GPS co-ordinates of the vehicle to the application server 102 and/or the database server 104 based on an occurrence of a triggering event. Examples of the triggering event include, but are not limited to, an arrival at or a departure from a location in the transportation network. In another embodiment, the navigation device 110 may transmit the GPS coordinates at expiration of a sample time. For example, the navigation device 110 may transmit the GPS coordinates after every 10 minutes during the predefined time interval. In an embodiment, a user of the navigation device 110 may select a first location and a select location in the geographical area from a user-interface of the navigation device 110. Thereafter, the navigation device 110 may send a query for recommending a route from one or more routes between the first and the second locations. Based on the query, the navigation device 110 may receive a user-interface from the application server 102, which the navigation device 110 may display to the user. In an embodiment, the user-interface may include the recommended route between the first and the second locations within the map of the geographical area. The user of the navigation device 110 (e.g., the driver or the navigator of the vehicle) may dynamically adjust the route of the vehicle and service the locations with lesser delay. An embodiment of recommending the route from the one or more routes between the first location and the second location has been explained in conjunction with FIG. 5.

The network 112 corresponds to a medium through which content and messages flow between various devices of the system environment 100 (e.g., the application server 102, the database server 104, the user-computing device 108, and the navigation device 110). Examples of the network 112 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 112 in accordance with various wired and wireless communication protocols such as Transmission Control Protocol and Internet Protocol (TCP/IP), User Datagram Protocol (UDP), and 2G, 3G, or 4G communication protocols.

Figure 2:
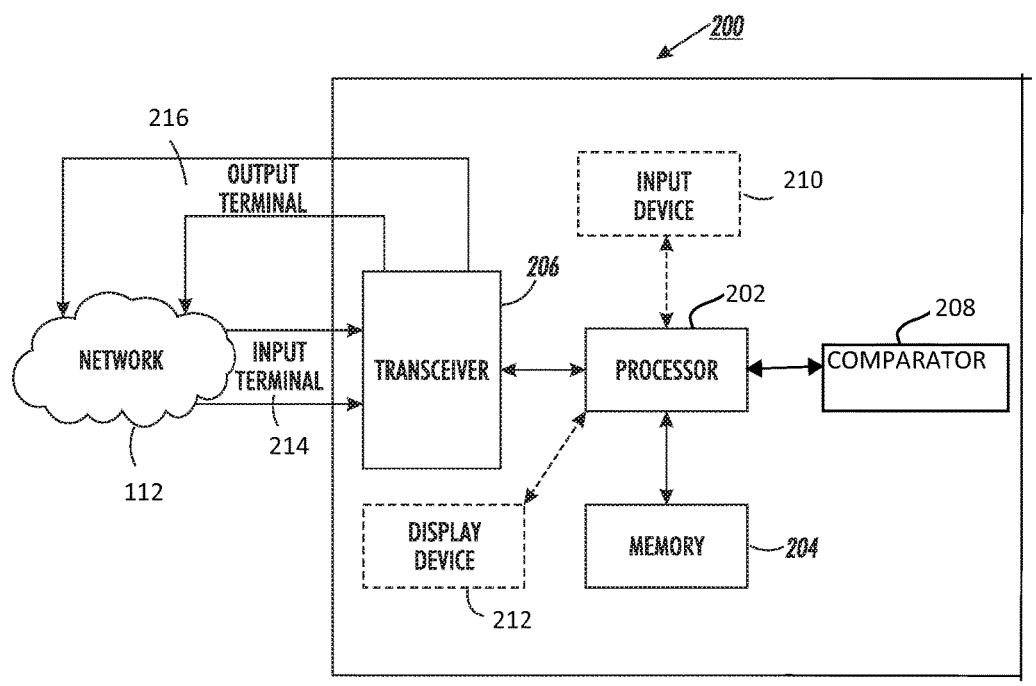
FIG. 2 is a block diagram that illustrates a system for determining an effect of a weather condition on a transportation network, in accordance with at least one embodiment.

FIG. 2 is a block diagram that illustrates a system 200 for determining an effect of the weather condition on the transportation network, in accordance with at least one embodiment. In an embodiment, the system 200 may correspond to the application server 102 or the user-computing device 108. For the purpose of ongoing description, the system 200 is considered the application server 102. However, the scope of the disclosure should not be limited to the system 200 as the application server 102. The system 200 may also be realized as the user-computing device 108, without departing from the spirit of the disclosure.

The system 200 includes a processor 202, a memory 204, a transceiver 206, a comparator 208, an input device 210, a display device 212, an input terminal 214, and an output terminal 216. The processor 202 is coupled to the memory 204, the transceiver 206, the comparator 208, the input device 210, and the display device 212. The transceiver 206 is connected to the network 112 through the input terminal 214 and the output terminal 216.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skills in the art that the one or more instructions stored in the memory 204 enable the hardware of the system 200 to perform the predetermined operations.

The transceiver 206 receives and transmits messages and data from/to various components of the system environment 100 (e.g., the database server 104, the user-computing device 108, and the navigation device 110) over the network 112 through the input terminal 214 and the output terminal 216. Examples of the transceiver 206 may include, but are not limited to, an antenna, an Ethernet port, a USB port, or any other port that can be configured to receive and transmit data. The transceiver 206 receives and transmits data/messages in accordance with the various communication protocols, such as, TCP/IP, UDP, and 2G, 3G, or 4G communication protocols through the input terminal 214 and the output terminal 216, respectively.

The comparator 208 is configured to compare at least two input signals to generate an output signal. In an embodiment, the output signal may correspond to either "1" or "0." In an embodiment, the comparator 208 may generate output "1" if the value of a first signal (from the at least two signals) is greater than the value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 2, a person skilled in the art will appreciate that the comparator 208 may be implemented within the processor 202 without departing from the scope of the disclosure.

The input device 210 may comprise suitable logic, circuitry, interfaces, and/or code that may be operable to receive an input from the user. The input device 210 may be operable to communicate with the processor 202. Examples of the input devices may include, but are not limited to, a touch screen, a keyboard, a mouse, a joystick, a microphone, a camera, a motion sensor, a light sensor, and/or a docking station.

The display device 212 may comprise suitable logic, circuitry, interfaces, and/or code that may be operable to render a display. In an embodiment, the display device 212 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 212 may be capable of receiving input from the user. In such a scenario, the display device 212 may be a touch screen that enables the user to provide input. In an embodiment, the touch screen may correspond to at least one of a resistive touch screen, capacitive touch screen, or a thermal touch screen. In an embodiment, the display device 212 may receive input through a virtual keypad, a stylus, a gesture, and/or touch based input.

Figure 3:
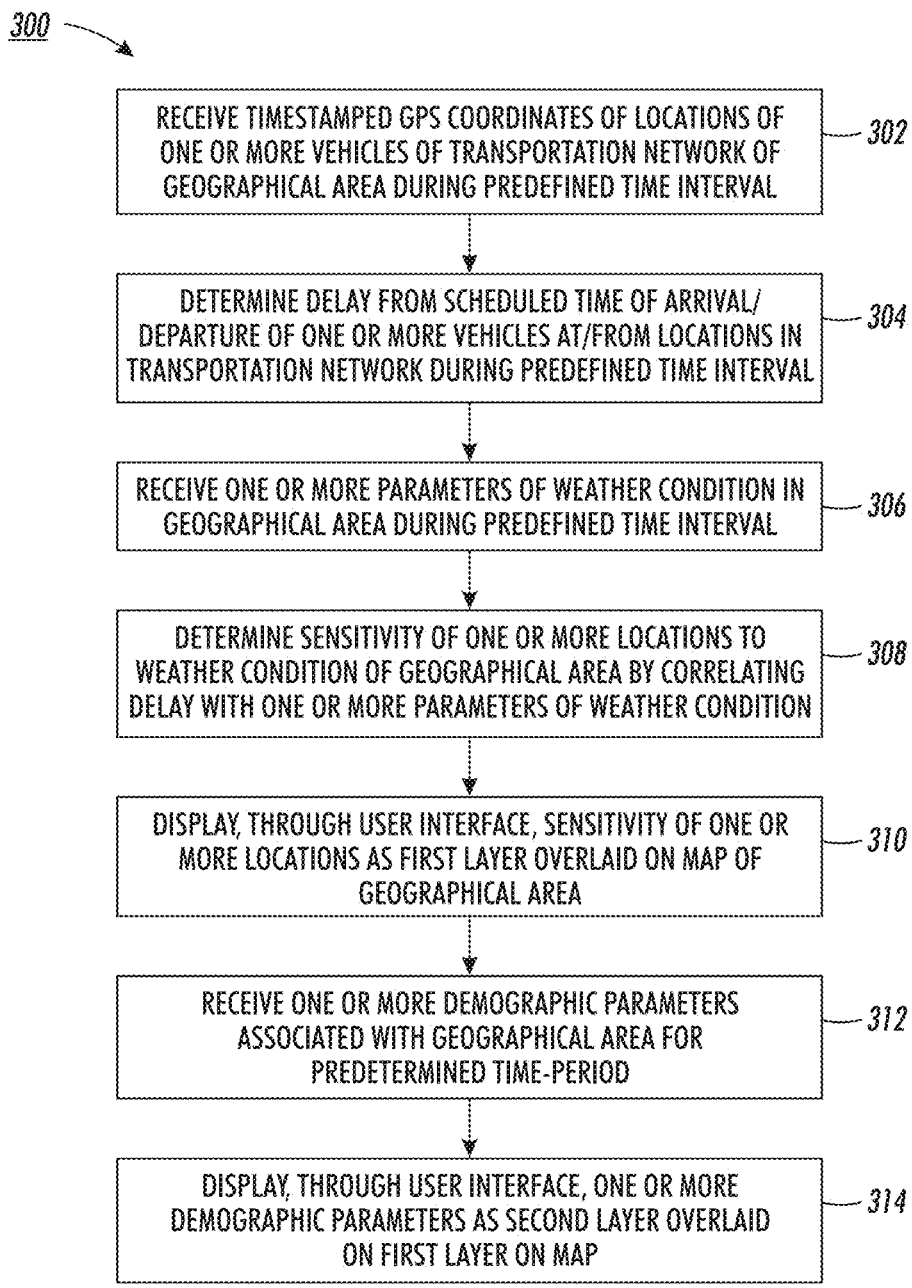
FIG. 3 is a flowchart illustrating a method for determining an effect of a weather condition on a transportation network, in accordance with at least one embodiment.

An embodiment of the operation of the system 200 for determining an effect of the weather condition on the transportation network has been explained further in conjunction with FIG. 3. Further, an embodiment of the operation of the system 200 for determination of the sensitivities of one or more routes between each pair of locations in the geographical area to the weather condition in the geographical area has been explained further in conjunction with FIG. 4. In addition, an embodiment of the operation of the system 200 for recommending a route from the one or more routes between a first location and a second location has been explained further in conjunction with FIG. 5.

FIG. 3 is a flowchart 300 illustrating a method for determining the effect of the weather condition on the transportation network, in accordance with at least one embodiment. The flowchart 300 has been described in conjunction with FIG. 1 and FIG. 2.

At step 302, the timestamped GPS co-ordinates of a location of the one or more vehicles during predefined time interval are received. In an embodiment, the processor 202 is configured to receive the timestamped GPS co-ordinates of the one or more vehicles from the navigation device 110 associated with each of the one or more vehicles during each predefined time interval (e.g., one day) through the transceiver 206. In an embodiment, such timestamped GPS coordinates may be collected for a predetermined time-period (e.g., 1 month) and stored as the GPS/Timestamp Database 106b. In an embodiment, the user may specify the predetermined time-period and the predefined time interval through the user-computing device 108 by providing suitable inputs. In another embodiment, during each predefined time interval, the navigation device 110 may directly upload the timestamped GPS co-ordinates of the respective vehicle (on which the navigation device 110 is installed) to the database server 104, which may store such uploaded data in the GPS/Timestamp Database 106b. In such a scenario, the navigation device 110 may not send the time-stamped GPS co-ordinates to the processor 202.

In an embodiment, the navigation device 110 may send the time-stamped GPS co-ordinates of the respective vehicles based on an occurrence of a triggering event. Examples of the triggering event include, but are not limited to, an arrival at or a departure from a location in the transportation network. For example, when a vehicle reaches a new location, the navigation device 110 may send the time-stamped GPS co-ordinates of the vehicle. For instance, the vehicle reaches Rochester, N.Y. at 10.00 AM. The navigation device 110 may send the timestamp, i.e., 10.00 AM, and the GPS co-ordinates of Rochester, N.Y. (e.g., the latitude/longitude co-ordinates of Rochester, N.Y., i.e., 43.1656° N, 77.6114° W).

In addition, the navigation device 110 may transmit the timestamped GPS coordinates at expiration of a sample time. For example, the navigation device 110 may transmit the GPS coordinates after every 10 minutes during predefined time interval.

The processor 202 may further receive a travel schedule associated with the each of the one or more vehicles from an authority/organization managing the transportation network of the one or more vehicles. The travel schedule may include a list of locations in the geographical area that are serviced by the vehicle along with an expected time of arrival and an expected time of departure to/from each location serviced by the vehicle. In an embodiment, the processor 202 may store the travel schedule associated with each of the one or more vehicles in the GPS/Timestamp Database 106b in the database server 104.

In an embodiment, the transportation network may correspond to a public transit system of the geographical area and the one or more vehicles may include one or more buses, one or more trams, one or more trains, or one or more metros of the public transit system. A person skilled in the art would appreciated that the scope of the disclosure should not be limited to the transportation network as the public transit system of the geographical area. The transportation network may correspond to any transportation network without departing from the spirit of the disclosure.

At step 304, a delay from a scheduled time of arrival/departure of the one or more vehicles at/from a location, of the one or more locations, in the transportation network is determined during each predefined time interval within the predetermined time-period. In an embodiment, the processor 202 is configured to determine the delay from the scheduled time of arrival/departure of the one or more vehicles at/from the location for the predetermined time-period. In an embodiment, the processor 202 may determine the delay using the received timestamped GPS co-ordinates of the locations of the one or more vehicles during each predefined time interval and the information pertaining to the travel schedule of the one or more vehicles in the GPS/Timestamp Database 106b. For example, the processor 202 determines that the vehicle V1 arrives at a location L1 at 10:12 AM. If the scheduled arrival time of the vehicle V1 at the location L1 during the time interval T1 is 10:00 AM, the processor 202 may determine a difference between the actual arrival time and scheduled arrival time of the vehicle V1 at the location L1 as 12 minutes. Similarly, the processor 202 may determine the delay in arrival of other vehicles at the location L1. For instance, a vehicle V2 is delayed by 10 minutes. Thereafter, the processor 202 may determine the value of delay at location L1 as an average of the delays of the vehicle V1 and the vehicle V2, i.e., 11 minutes (an average of 12 minutes and 10 minutes). A person skilled in the art will appreciate that the processor 202 may determine the average delay values for each of the one or more locations in the geographical area during each predefined time interval in a similar manner. In an embodiment, the processor 202 may store the delay values of the one or more vehicles at each of the one or more locations during each predefined time interval in the predetermined time-period in the Map Database 106d in the database server 104.

A person skilled in the art will appreciate that any statistical technique may be used to determine the average delays of each vehicle at each location during the predefined time intervals and the average delay value for each location from the average delays of the individual vehicles at the location. Examples of such statistical techniques include, but are not limited to, a mean, a rolling average, a weighted average, a median, a mode, or any mathematical or statistical technique that can aggregate values.

At step 306, the one or more parameters of the weather condition in the geographical area during each predefined time interval. In an embodiment, the processor 202 is configured to receive the one or more parameters of the weather condition in the geographical area during each predefined time interval (e.g., each day) in the predetermined time-period (e.g., a previous month) from one or more sources such as, but not limited to, a Weather/Meteorological department of the geographical area, a news agency covering the geographical area, and so on. In an embodiment, the processor 202 may receive the one or more parameters of the weather condition from the one or more sources at the end of a sample time, for example, after every 10 minutes during each predefined time interval. Examples of the one or more parameters of the weather condition include, but are not limited to, a snowfall precipitation, a rainfall precipitation, a temperature, a wind speed, or an air pressure. In an embodiment, the processor 202 may store the one or more parameters of the weather condition in the Weather Database 106*a* in the database server 104. In another embodiment, the database server 104 may collect the one or more parameters of the weather condition during each predefined time interval in the predetermined time-period from the aforementioned one or more sources, and store the one or more parameters in the Weather Database 106*a*.

In an embodiment, the one or more parameters may correspond to average values or aggregate values of the one or more parameters of the weather condition determined by a Weather/Meteorological department during each predefined time interval (e.g., a day) in the predetermined time-period (e.g., a month) for the geographical area or a geographical region within which the geographical area lies. As discussed, the processor 202 may receive the values of the one or more parameters at the end of the sample time, for example, after every 10 minutes during each predefined time interval. Based on the type of the parameter of the weather condition, the processor 202 may consider the values of the parameter for the predefined time interval as an average or an aggregate of the values of the parameter received at the end of the various sample times in the predefined time interval. For example, the snowfall (or rainfall) recorded during three sample times in the predefined time interval at a location are 2 cms, 3 cms and 8 cms. Hence, the processor 202 may determine the value of the parameter snowfall (or rainfall) for the predefined time interval as 13 cms (i.e., 2+3+8 cms). Further, the temperature recorded during the three sample times are 23° C., 22.9° C., and 23.1° C. Therefore, the processor 202 may determine the value of the parameter temperature as 23° C. (i.e., (23+22.9+23.1)/3). A person skilled in art would appreciate that the scope of the disclosure is not limited to the one or more parameters as the average values or aggregate values of the one or more parameters of the weather condition during each predefined time interval for the geographical area. In an embodiment, the one or more parameters of weather condition may be received for each location in the geographical area, in case the geographical area is larger than a predetermined area (e.g., a large city/county).

At step 308, the sensitivity of the one or more locations to the weather condition of the geographical area is determined. In an embodiment, the processor 202 is configured to determine the sensitivity of each of the one or more locations in the geographical area to the weather condition of the geographical area. In an embodiment, the processor 202 may determine the sensitivity of each location by correlating the delay of the one or more vehicles at the location during the predetermined time-period with the one or more parameters of the weather condition during the predetermined time-period. In an embodiment, the processor 202 extracts the delays of the one or more vehicles at each of the one or more locations from the Map Database 106*d* and the one or more parameters of the weather condition from the Weather Database 106*a* in the database server 104. Thereafter, the processor 202 may discretize the values of the delays at each location and the one or more parameters of the weather condition using a threshold value of delay and threshold values of the respective parameters of the weather condition. In an embodiment, the user of the user-computing device 108 may provide the threshold value of delay and the threshold values of the respective parameters of the weather condition. For example, the threshold value for the delay may be equal to 6 minutes, while the threshold value for one of the parameters of the weather condition such as "snowfall precipitation" may be equal to 0 centimeters (cm). Thus, a delay value of less than 6 minutes behind the travel schedule may be discretized as a binary "0" (or "no delay"), while a delay value greater than or equal to 6 minutes may be discretized as a binary "1" (or "delay"). After discretizing the values of the delays at each location during each predefined time interval and discretizing the values of the one or more parameters of the weather condition during the respective predefined time intervals, the processor 202 may assign the discretized values to discrete random variables such as X and Y, respectively. The following table illustrates an example of values of the discrete random variables X and Y representing the discretized values of the delay and a parameter of the weather condition, e.g., "snowfall precipitation".

TABLE 1

Example of discretized values of the delay (represented by the discrete random variable X) and the parameter of the weather condition "snowfall precipitation" (represented by the discrete random variable Y)

| Predefined time interval (1 day) | X (Delay/No Delay) | Y (Snowfall/No Snowfall) |
|---|---|---|
| Day-1 | No Delay (0) | No Snowfall (0) |
| Day-2 | Delay (1) | Snowfall (1) |
| Day-3 | No Delay (0) | No Snowfall (0) |
| Day-4 | Delay (1) | Snowfall (1) |
| Day-5 | Delay (1) | Snowfall (1) |
| Day-6 | Delay (1) | No Snowfall (0) |
| Day-7 | Delay (1) | Snowfall (1) |

The above table illustrates an example of discretized values of the delay and the snowfall precipitation during seven predefined time intervals of one day each in a predetermined time-period of one week at a location in the geographical area. As shown above, the discrete random variable X represents a discrete event of an average delay of more than 6 minutes at the location during a particular day, while the discrete random variable Y represents a discrete event of snowfall precipitation (i.e., greater than 0 cm of snowfall) at the location during the same day. For the discrete random variable X, the event of "Delay" may be represented with '1', while the event of "No Delay" may be represented with '0'. Similarly, for the random variable Y, the event of "Snowfall" may be represented with '1', while the event of "No Snowfall" may be represented with '0.

Thereafter, in an embodiment, the processor 202 may utilize a mutual information based correlation technique to determine the sensitivity of each location to the weather condition using the values assigned to the discrete random variables X and Y. In an embodiment, the processor 202 may determine the mutual information based correlation by utilizing the following equation:

$$I(X;Y) = \sum_{x \in X} \sum_{y \in Y} P(x;y) \log\left(\frac{P(x;y)}{P(x)P(y)}\right) \quad (1)$$

where,

I(X;Y): a measure of mutual information between the discrete random variables X and Y;

P(x): a probability of the random variable X having a value "x";

P(y): a probability of the random variable Y having a value "y"; and

P (x; y): a joint probability of the random variable X having a value "x" and the random variable Y having a value "y".

Referring to the Table 1, the average delay at the location on a Day-1 is not more than 6 minutes and the location experiences no snowfall during the Day-1. However, on a Day-2, the average delay at the location is more than 6 minutes and the location experiences snowfall on the Day-2, and so on. Based on the values of the discrete random variables X and Y shown in the Table 1, the processor 202 may determine the various probability values used in equation 1 such as P(x), P(y), and P(x; y) for all values of x (i.e., 0 and 1) and y (i.e., 0 and 1). In the current scenario (considering the example illustrated in Table 1), the various probability values are: P(x=0)=2/7, P(x=1)=5/7, P(y=0)=3/7, P(y=1)=4/7, P(x=0; y=0)=2/7, P(x=0; y=1)=0, P(x=1; y=0)=1/7, and P(x=1; y=1)=4/7. Using equation 1 and the aforementioned probability values, the processor 202 may determine the value of the mutual information, I (X; Y), as 0.469. In an embodiment, the sensitivity may be represented in terms of the mutual information, I (X; Y). In the current scenario, as the value of mutual information is non-zero, snowfall may have considerable effect on the delays. Higher the value of mutual information higher the correlation of the delays with the weather condition.

A person skilled in the art would appreciate that the processor 202 may determine a separate sensitivity value for each parameter associated with the weather condition. Further, a person skilled in the art would appreciate that the scope of the disclosure is not limited to determining the sensitivity (at the step 308) based on the mutual information. Various other correlation techniques known in the art may be used to determine the sensitivity (at the step 308) without departing from the spirit of the disclosure.

At step 310, the sensitivity of the one or more locations to the weather condition is displayed through the user interface as the first layer overlaid on the map of the geographical area. In an embodiment, the processor 202 is configured to display the sensitivity of the one or more locations as the first layer overlaid on the map. Prior to displaying the sensitivity, the processor 202 may extract information pertaining to the map of the geographical area from the Map Database 106d. Thereafter, the processor 202 may overlay the sensitivity of the one or more locations as the first layer over the representation of the respective one or more locations in the map of the geographical area. The processor 202 may then transmit a user-interface including the map overlaid with the first layer to the user-computing device 108, which may display the user-interface to the user. An example of the user-interface displaying the map overlaid with the first layer (i.e., the sensitivities of the one or more locations) has been explained in conjunction with FIG. 7.

In an embodiment, the one or more vehicles may correspond to private vehicles owned and operated by private individuals or enterprises. In such a scenario, the navigation device 110 installed in each such vehicle may send an Expected Time of Arrival (ETA) of the respective vehicle at a location along with the time-stamped GPS coordinates of the vehicle to the processor 202. In an embodiment, the navigation device 110 may determine the ETA of the respective vehicle at the location based on various factors such as traffic conditions on a route on which the vehicle is traveling on, shortest path to the location, and so on. In an embodiment, the navigation device 110 may send the information pertaining to the ETA and the timestamped GPS coordinates of the vehicle to the processor 202 at an occurrence of a triggering event such as, but not limited to, an arrival at or a departure from a location. Further, the navigation device 110 may send such information at the end of a sample time, for example, after every 10 minutes in the predefined time interval. The processor 202 may determine a delay of the vehicle at the location during each predefined time interval based on a difference between the timestamp and the ETA. Thereafter, the processor 202 may determine an average delay value at the location during each predefined time interval as an average of delays of the one or more vehicles at the location during the respective predefined time intervals. A person skilled in the art will understand that the processor 202 may determine the average delays at each location during each predefined time interval, in a similar manner. Further, the processor 202 may determine the sensitivity of the one or more locations to the weather condition, in a manner similar to that explained above.

A person skilled in the art would appreciate that the transportation network may correspond to a public transit system of the geographical area and the one or more vehicles may include one or more buses, one or more trams, one or more trains, or one or more metros of the public transit system. In such a scenario, the processor 202 may receive the information pertaining to the map of the geographical area from one or more sources such as, but not limited to, a public transit agency of the geographical area, a tourism agency of the geographical area, or a city-planning department of the geographical area. In an embodiment, the map may represent one or more nodes of the public transit system at the one or more locations of the geographical area. Examples of the one or more nodes of the public transit system include, but are not limited to, one or more bus stops, one or more tramway stations, one or more train stations, or one or more metro stations in the geographical area. In an embodiment, the processor 202 may store the map in the Map Database 106d in the database server 104.

At step 312, the one or more demographic parameters associated with the geographical area for the predetermined time-period may be received. In an embodiment, the processor 202 may be configured to receive the one or more demographic parameters associated with the geographical area for the predetermined time-period from one or more sources such as, but not limited to, a Population Census organization, a Municipal Corporation of the geographical area, or any other government/private agency collecting and maintaining such data. Examples of the one or more demographic parameters associated with the geographical area include, but are not limited to, a population distribution, an income distribution, one or more business districts/households, one or more city centers, and one or more suburbs of the geographical area. In an embodiment, the processor 202 may store the one or more demographic parameters in the Demographics Database 106c.

A person skilled in the art would appreciate that the scope of the disclosure should not be limited to the examples of the one or more demographic parameters mentioned above. Further, the one or more demographic parameters may be received from various other information sources providing population statistics about the geographical area without departing from the scope of the disclosure.

At step 314, the one or more demographic parameters are displayed through the user interface as the second layer overlaid on the map of the geographical area. In an embodiment, the processor 202 is configured to display the one or more demographic parameters on the map of the geographical area by overlaying the one or more parameters as the second layer over the previously overlaid first layer on the map. Prior to displaying the one or more demographic parameters, the processor 202 may extract information pertaining to the map of the geographical area from the Map Database 106d. Thereafter, the processor 202 may overlay the one or more demographic parameters related to each of the one or more locations as the second layer over the representation of the respective one or more locations in the map of the geographical area. The processor 202 may then transmit the user-interface including the map overlaid with the first layer and the second layer to the user-computing device 108, which may display the user-interface to the user. An example of the user-interface displaying the map overlaid with the first layer (representing the sensitivities of the one or more locations) and the second layer (representing the one or more demographic parameters) has been explained in conjunction with FIG. 8.

The sensitivities of each of the one or more locations and the demographic parameters of the one or more locations, overlaid on the map of the geographical area, may provide useful insights to various organizations such as, but not limited to, town planning organizations, transportation agencies, and third party organizations providing consultation to the transportation agencies. For example, such a visualization of the sensitivities and the demographic parameters may help in diagnosing bottlenecks in the transportation network and identifying locations that are prone to excessive delays. Further, the reasons as to why such locations are prone to delays may be determined based on the demographic parameters such as population density at the identified locations. For example, a densely populated area may be prone to more delays during rainfall. On the other hand, snow may be cleared faster in and around city centers. Based on the analysis, the various organizations may make the identified locations more robust to weather related delays by improving the transportation infrastructure in and around the location. Further, the transportation agencies may provide better service to the identified locations by deploying additional vehicles and refining the schedule of the vehicles.

A person skilled in the art will appreciate that the one or more locations may be made robust to weather related delays in various other ways without departing from the scope of the disclosure.

Figure 4:
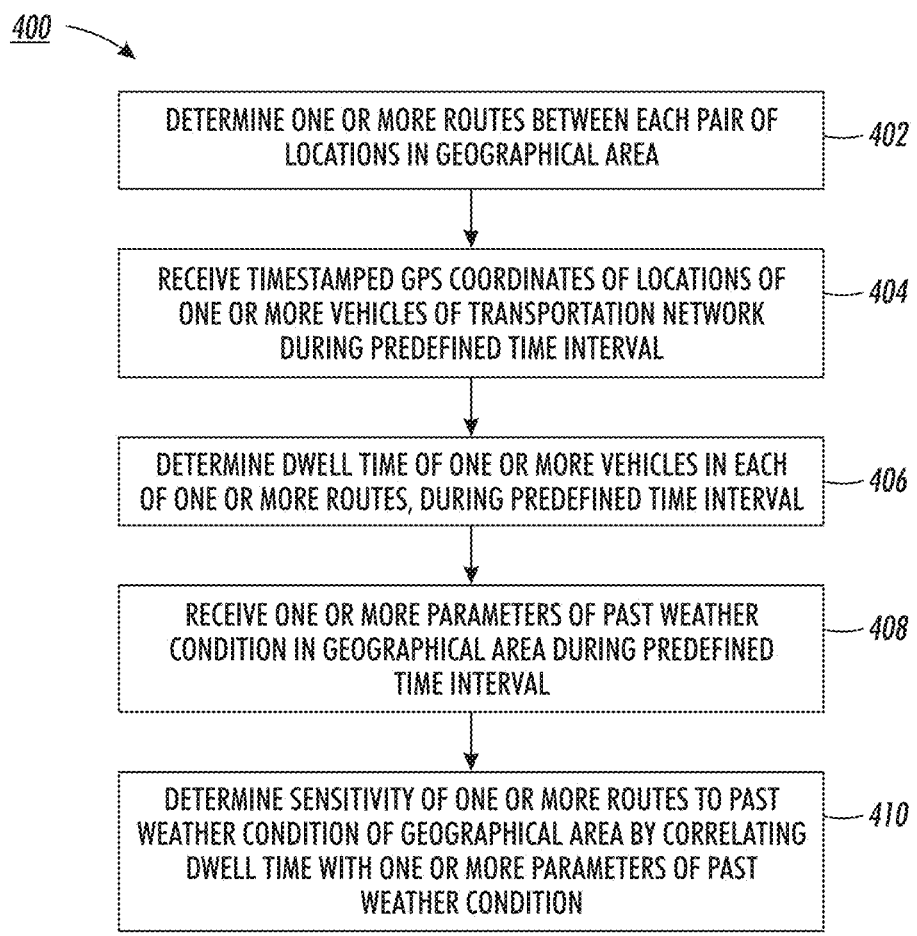
FIG. 4 is a flowchart illustrating a method for determining sensitivities of one or more routes between each pair of locations in a geographical area to weather condition in the geographical area, in accordance with at least one embodiment.

FIG. 4 is a flowchart 400 illustrating a method for determining sensitivities of one or more routes between each pair of locations in the geographical area to the weather condition in the geographical area, in accordance with at least one embodiment. The flowchart 400 has been described in conjunction with FIG. 1 and FIG. 2.

At step 402, one or more routes between each pair of locations in the geographical area are determined. In an embodiment, the processor 202 is configured to determine the one or more routes between each pair of locations. In an embodiment, the processor 202 may extract information pertaining to the map of the geographical area from the Map Database 106D. Thereafter, based on the extracted information, the processor 202 may identify the one or more routes between each pair of locations. In an embodiment, each of the one or more routes may include one or more segments. Each such segment may correspond to a path between a pair of locations. For example, referring to FIG. 9, the processor 404 may determine the one or more routes between the pair of locations 904A and 904D as 904A→904B→904C→904D, 904A→904E→904C→904D, and 904A→904F→904D. The various segments in the first route between the locations 904A and 904D include 904A to 904B, 904B to 904C, and 904C to 904D. Similarly, the various segments in the second route between the locations 904A and 904D include 904A to 904E, 904E to 904C, and 904C to 904D, and so on.

At step 404, the timestamped GPS co-ordinates of the locations of the one or more vehicles during each predefined time interval in the predetermined time-period are received. In an embodiment, the processor 202 is configured to receive the timestamped GPS co-ordinates of the one or more vehicles from the navigation device 110 associated with each of the one or more vehicles during each predefined time interval (e.g., one day) in the predetermined time-period (e.g., one month) through the transceiver 206. In an embodiment, the processor 202 may store the information pertaining to the timestamped GPS co-ordinates of the one or more vehicles as the GPS/Timestamp Database 106b. The processor 202 may update the GPS/Timestamp Database 106b at the end of each predefined time interval in the predetermined time-period to store the timestamped GPS co-ordinates of the one or more vehicles during the particular predefined time interval. In another embodiment, during each predefined time interval, the navigation device 110 may directly upload the timestamped GPS co-ordinates of the respective vehicle (on which the navigation device 110 is installed) to the database server 104, which may store such uploaded data in the GPS/Timestamp Database 106b. In such a scenario, the navigation device 110 may not send the timestamped GPS co-ordinates to the processor 202.

As explained earlier, in an embodiment, the navigation device 110 may send the timestamped GPS coordinates of the respective vehicles on an occurrence of various triggering events such as, but not limited to, an end of each predefined time interval, an arrival at or a departure from a location in the transportation network, a halt/stoppage at any point within a route, a start from any point within a route, and so on. In an embodiment, the processor 202 may use the GPS coordinates of the various vehicles to determine the route on which the vehicles are plying. Further, the processor 202 may use the information pertaining to the timestamps of the vehicles to determine the dwell times of the vehicles, as explained next.

At step 406, the dwell time of each of the one or more vehicles in each of the one or more routes during each predefined time interval in the predetermined time-period is determined. In an embodiment, the processor 202 is configured to determine the dwell time of the one or more vehicles in each of the one or more routes during each predefined time interval in the predetermined time-period. To determine the dwell time, in an embodiment, the processor 202 may initially extract the information pertaining to the timestamped GPS coordinates of the one or more vehicles during each predefined time interval in the predetermined time-period from the GPS/Timestamp Database 106b. Thereafter, based on the GPS coordinates of each vehicle during each predefined time interval, the processor 202 may determine one or more segments on which the respective vehicles plied during the respective predefined time interval. Further, based on the timestamps of the GPS coordinates of each vehicle, the processor 202 may determine a dwell time of the respective vehicles within the segments on which the vehicle traveled during the predefined time interval.

For example, during a predefined time interval, the navigation device 110 of a vehicle may send the timestamped GPS coordinates of the vehicle to the processor 202 when the vehicle stops at any point within a segment of a route (a triggering event). Further, during the predefined time interval, the navigation device 110 of the vehicle may also send the timestamped GPS coordinates of the vehicle to the processor 202 when the vehicle starts from the point at which the vehicle initially stopped in the segment of the route (another triggering event). Based on a difference of the second timestamp and the first timestamp received from the navigation device 110, the processor 202 may determine the stoppage time of the vehicle at that particular point in the segment of the route. During each predefined time interval, the navigation device 110 may continue sending such timestamped GPS coordinates of the vehicle to the processor 202 when the vehicle stops at/starts from any point within the one or more segments of the route. The processor 202 may determine the stoppage times of the vehicle at the various points in each segment of the route during each predefined time interval, in a similar manner. Thereafter, the processor 202 may determine the dwell time of the vehicle in each segment of the route as an average of the stoppage times of the vehicle in the various points in the segment during the predefined time interval. The processor 202 may determine an average dwell time for each segment during each predefined time interval as an average of the dwell times determined for each of the one or more vehicles during the respective predefined time intervals. Further, in an embodiment, the processor 202 may determine the dwell time of the one or more vehicles in each of the one or more routes during each predefined time interval as an average of the average dwell times of each segment in the respective routes during the respective predefined time intervals. In an embodiment, the processor 202 may store the dwell time of the one or more vehicles in each of the one or more routes during each predefined time interval in the Map Database 106d.

A person skilled in the art would appreciate that any statistical technique may be used to determine the average dwell time. Examples of such statistical techniques include, but are not limited to, a mean, a rolling average, a weighted average, a median, a mode, or any mathematical or statistical technique that can aggregate values.

At step 408, the one or more parameters associated with the past weather condition in the geographical area during each predefined time interval in the predetermined time-period is received. In an embodiment, the processor 202 is configured to receive the one or more parameters associated with the past weather condition during each predefined time interval (e.g., each day) in the predetermined time-period (e.g., the previous month) from one or more sources such as, but not limited to, a Weather/Meteorological department of the geographical area, a news agency covering the geographical area, and so on. Examples of the one or more parameters of the past weather condition include, but are not limited to, a snowfall precipitation, a rainfall precipitation, a temperature, a wind speed, or an air pressure. In an embodiment, the processor 202 may store the one or more parameters of the past weather condition in the Weather Database 106a in the database server 104. The step 406 may be performed in a manner similar to that described in the step 306 in conjunction with FIG. 3.

At step 410, the sensitivity of the one or more routes to the past weather condition of the geographical area during each predefined time interval in the predetermined time-period is determined. In an embodiment, the processor 202 is configured to determine the sensitivity of each of the one or more routes to the past weather condition by correlating the dwell time of the one or more vehicles in each of the one or more routes during each predefined time interval with the one or more parameters of the past weather condition during the respective predefined time intervals. In an embodiment, the processor 202 may extract the dwell time of the one or more vehicles in each of the one or more routes during each predefined time interval from the Map Database 106d and the one or more parameters of the past weather condition during the respective predefined time intervals from the Weather Database 106a. Thereafter, the processor 202 may discretize the values of the dwell time in each route during each predefined time interval and the one or more parameters of the past weather condition during the respective predefined time intervals using a threshold value of the dwell time and threshold values of the respective parameters of the past weather condition, which may be specified by the user of the user-computing device 108. The discretization of the values of the dwell time and the one or more parameters of the past weather condition may be performed in a manner similar to that described in step 308 in conjunction with FIG. 3. Thereafter, the processor 202 may assign the discretized values of the dwell time during each predefined time interval and the one or more parameters of the past weather condition during the respective predefined time intervals to discrete random variables X and Y. Further, the processor 202 may determine a measure of mutual information between the discrete random variables X and Y to determine the sensitivity of the dwell time during each predefined time interval (represented by the random variable X) to one or more parameters of the past weather condition during the respective predefined time intervals (represented by the random variable Y) for each of the one or more routes. In an embodiment, the processor 202 may utilize the equation 1 to determine the mutual information. In an embodiment, the value of the mutual information, so determined, may be representative of the sensitivity.

A person skilled in the art would appreciate that the processor 202 may determine a separate sensitivity value for each parameter associated with the past weather condition. Further, a person skilled in the art would appreciate that the scope of the disclosure is not limited to determining the sensitivity (at the step 410) based on the mutual information. Various other correlation techniques known in the art may be used to determine the sensitivity (at the step 410) without departing from the spirit of the disclosure.

Figure 5:
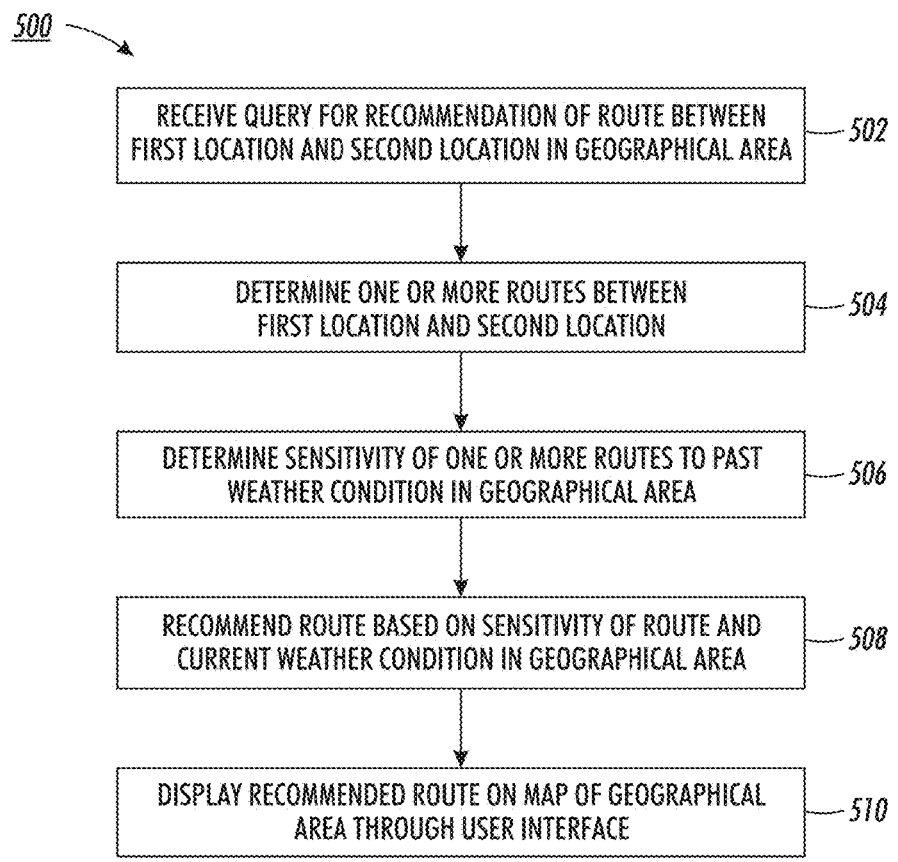
FIG. 5 is a flowchart illustrating a method for recommending a route from one or more routes between a first location and a second location in a geographical area, in accordance with at least one embodiment.

FIG. 5 is a flowchart 500 illustrating a method for recommending a route from one or more routes between a first location and a second location in the geographical area, in accordance with at least one embodiment. The flowchart 500 has been described in conjunction with FIG. 1, FIG. 2, and FIG. 4.

At step 502, a query for a recommended route between a first location and a second location in the geographical area is received. In an embodiment, the processor 202 is configured to receive the query for the recommended route between the first and the second locations from the navigation device 110 and/or the user-computing device 108. In an embodiment, a user of the navigation device 110 and/or the user-computing device 108 may select the first location and the second location through a user interface. Thereafter, the navigation device 110 and/or the user-computing device 108 may send the query including of an identification of the selected the first location and the second location to the processor 202.

At step 504, the one or more routes between the first location and the second location are determined. In an embodiment, the processor 202 is configured to determine the one or more routes between the first location and the second location. To that end, the processor 202 may extract information pertaining to the map of the geographical area from the Map Database 106d. Thereafter, the processor 202 may determine the one or more routes and the one or more segments within each route between the first and the second locations, in a manner similar to that described in step 402 (in conjunction with FIG. 4).

At step 506, the sensitivity of the one or more routes (determined at step 504) to a past weather condition of the geographical area is determined. In an embodiment, the processor 202 is configured to determine the sensitivity of the one or more routes to the past weather condition of the geographical area, in a manner similar to that described in steps 404 through 410 in conjunction with FIG. 4.

At step 508, the route from the one or more routes is recommended based on the sensitivity of the route (determined at the step 408) and a current weather condition in the geographical area. In an embodiment, the processor 202 is configured to recommend the route from the one or more routes between the first location and the second location. In an embodiment, the processor 202 may receive one or more parameters related to the current weather condition in the geographical area from one or more sources such as, but not limited to, a Weather/Meteorological department of the geographical area, a news agency covering the geographical area, and so on. Examples of the one or more parameters related to the current weather condition may include, but are not limited to, a current snowfall precipitation level, a current rainfall precipitation level, a current temperature (e.g., maximum and minimum temperatures of an ongoing day), a current wind speed, and a current air pressure. In an embodiment, the processor 202 may store the one or more parameters related to the current weather condition in the Weather Database 106a. Alternatively, the database server 104 may collect such information from the one or more sources and store such information in the Weather Database 106a.

Thereafter, based on the one or more parameters related to the current weather condition and the sensitivity of each of the one or more routes, the processor 202 may recommend the route from the one or more routes. For example, the current weather conditions indicates a snowfall precipitation of 3 cm in the geographical area. In such a scenario, the processor 202 may identify a route that is least correlated to the snowfall precipitation (i.e., a route having the least value of sensitivity towards snowfall) among the one or more routes. The processor 202 may recommend such a route as an ideal route for the current weather condition parameter of snowfall precipitation. Alternatively, if the current weather conditions indicate no snowfall, the processor 202 may recommend a shortest route between the first and the second locations as the recommended route, irrespective of the sensitivities of the one or more routes to the weather conditions. Hence, in such a scenario, a route with a higher sensitivity may be recommended if the route is the shortest route among the one or more routes.

A person skilled in the art would appreciate that the processor 202 may identify an ideal route for each parameter related to the current weather condition. Thereafter, in an embodiment, the processor 202 may recommend the route, which is ideal for a majority of the parameters related to the current weather condition. Alternatively, the processor 202 may rank the routes identified as ideal for the various parameters related to the current weather condition based on the sensitivity of the identified ideal routes to the respective parameters. In another embodiment, the processor 202 may rank each route identified as ideal for a particular parameter related to the current weather condition based on the sensitivity of the identified route to each parameter. Such a ranking may be based on a weighted average of the sensitivities of the identified ideal routes to the various parameters related to the current weather condition.

At step 510, the recommended route is displayed on the map of the geographical area through the user-interface on the navigation device 110 and/or the user-computing device 108. In an embodiment, the processor 202 is configured to display the recommended route within the map. Prior to displaying the recommended route within the map, the processor 202 may extract information pertaining to the map of the geographical area from the Map Database 106d. Thereafter, the processor 202 may highlight the route on the map and generate a user-interface including the map. The processor 202 may transmit the user-interface to the navigation device 110 and/or the user-computing device 108, which may display the map with the recommended route to the user through the user-interface. An example of the user-interface displaying the recommended route has been explained in conjunction with FIG. 8.

Figure 6:
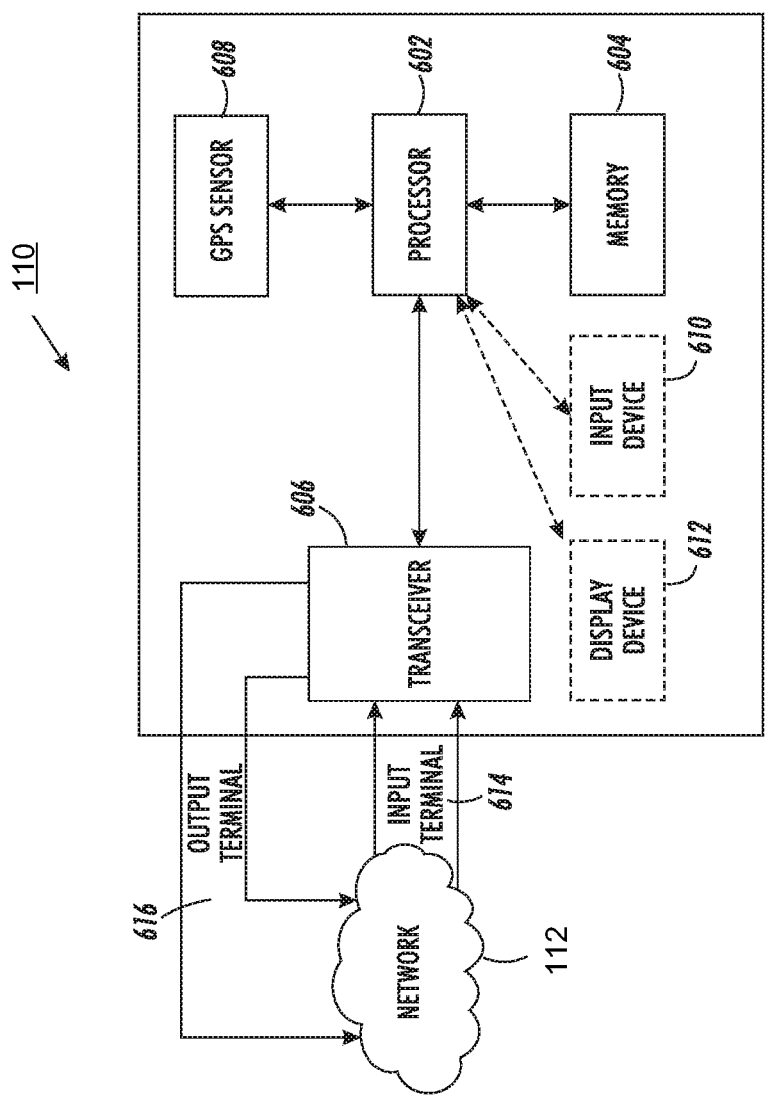
FIG. 6 is a block diagram that illustrates a navigation device, in accordance with at least one embodiment.

FIG. 6 is a block diagram that illustrates the navigation device 110, in accordance with at least one embodiment. The navigation device 110 includes a processor 602, a memory 604, a transceiver 606, a GPS sensor 608, an input device 610, a display device 612, an input terminal 614, and an output terminal 616. The processor 602 is coupled to the memory 604, the transceiver 606, the GPS sensor 608, the input device 610, and the display device 612. The transceiver 606 is connected to the network 112 through the input terminal 614 and the output terminal 616.

The processor 602 includes suitable logic, circuitry, and/or interfaces that are operable to execute one or more instructions stored in the memory 604 to perform predetermined operations. The processor 602 may be implemented using one or more processor technologies known in the art. Examples of the processor 602 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 604 stores a set of instructions and data. Some of the commonly known memory implementations include, but are not limited to, a random access memory (RAM), a read only memory (ROM), a hard disk drive (HDD), and a secure digital (SD) card. Further, the memory 604 includes the one or more instructions that are executable by the processor 602 to perform specific operations. It is apparent to a person with ordinary skills in the art that the one or more instructions stored in the memory 604 enable the hardware of the navigation device 110 to perform the predetermined operations.

The transceiver 606 receives and transmits messages and data from/to various components of the system environment 100 (e.g., the application server 102, the database server 104, and the user-computing device 108) over the network 112 through the input terminal 614 and the output terminal 616. Examples of the transceiver 606 may include, but are not limited to, an antenna, an Ethernet port, a USB port, or any other port that can be configured to receive and transmit data. The transceiver 606 receives and transmits data/messages in accordance with the various communication protocols, such as, TCP/IP, UDP, and 2G, 3G, or 4G communication protocols through the input terminal 614 and the output terminal 616, respectively.

The GPS sensor 608 may monitor GPS coordinates of a location of the navigation device 110 (i.e., the location of a vehicle in which the navigation device 110 is installed) in real-time. In an embodiment, the GPS sensor 608 may be implemented using any Geospatial Positioning technology known in the art. Examples of the GPS sensor 608 include, but are not limited to, Assisted-GPS sensor, Galileo sensor, Compass sensor, and GLONASS sensor.

The input device 610 may comprise suitable logic, circuitry, interfaces, and/or code that may be operable to receive an input from the user. The input device 610 may be operable to communicate with the processor 602. Examples of the input devices may include, but are not limited to, a touch screen, a keyboard, a mouse, a joystick, a microphone, a camera, a motion sensor, a light sensor, and/or a docking station.

The display device 612 may comprise suitable logic, circuitry, interfaces, and/or code that may be operable to render a display. In an embodiment, the display device 612 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 612 may be capable of receiving input from the user. In such a scenario, the display device 612 may be a touch screen that enables the user to provide input. In an embodiment, the touch screen may correspond to at least one of a resistive touch screen, capacitive touch screen, or a thermal touch screen. In an embodiment, the display device 612 may receive input through a virtual keypad, a stylus, a gesture, and/or touch based input.

In operation, the processor 602 may monitor the GPS coordinates of the location of the navigation device 110 (and in-turn the vehicle in which the navigation device 110 is installed) in real-time by utilizing the GPS sensor 608. In an embodiment, the processor 602 may timestamp the GPS coordinates based on the current time when the GPS coordinates were monitored. Thereafter, the processor 602 may send the timestamped GPS coordinates of the vehicle on the occurrence of a triggering event such as, but not limited to, the vehicle arriving at a location, the vehicle departing from a location, and the vehicle stopping at/starting from a point in a route. Further, the processor 602 may send the timestamped GPS coordinates at the end of a sample time, for example, after every 10 minutes during the predefined time interval.

Further, in an embodiment, the processor 602 may display a user-interface to a user of the navigation device 110 through the display device 612. In an embodiment, through the user-interface, the user of the navigation device 110 may select a first location and a second location within the geographical area. Thereafter, the processor 602 may send a query to the application server 102 through the transceiver 606 for receiving a recommendation of a route between the first location and the second location. In response to the query, the processor 602 may receive information pertaining to the recommended route between the first and the second locations from the application server 102. The processor 602 may display the recommended route on a map of the geographical area through the user-interface on the display device 612.

Figure 7:
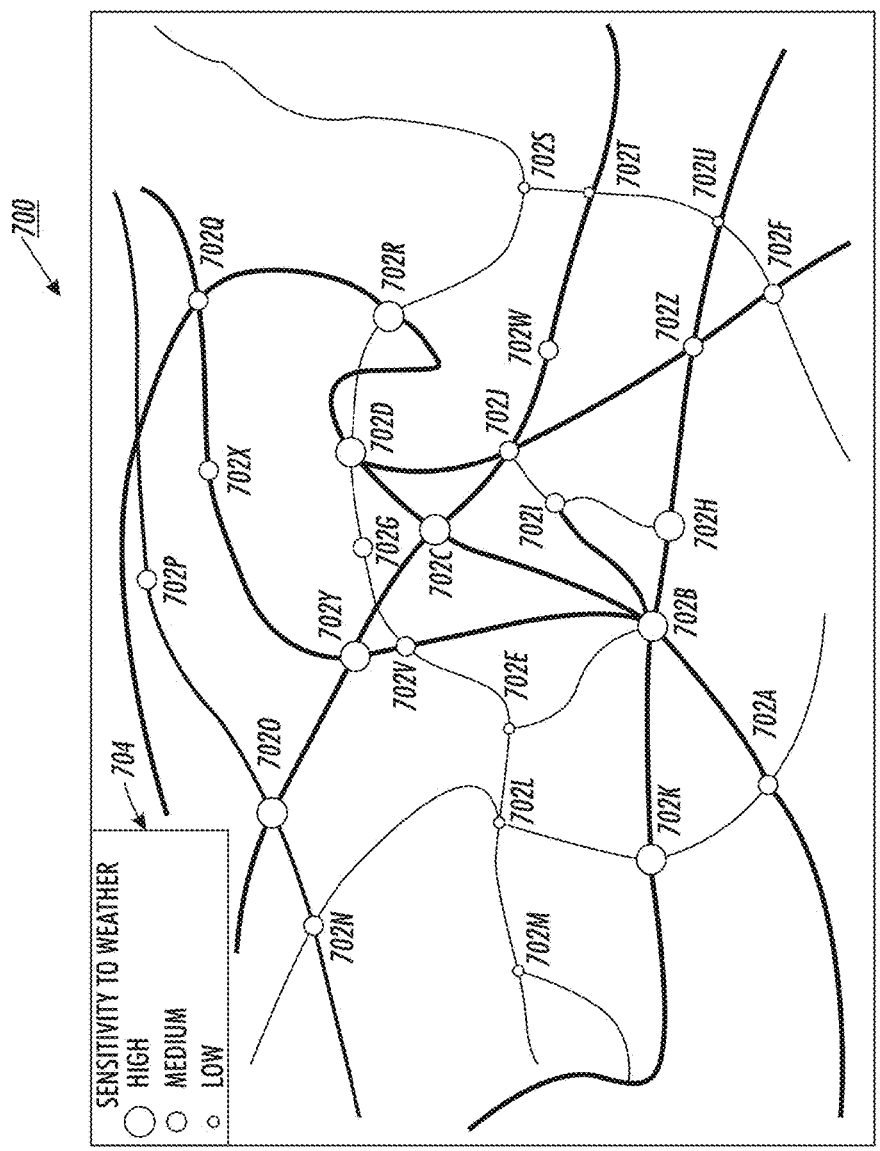
FIG. 7 illustrates an example of a user-interface displaying a map of a geographical area overlaid with a first layer (i.e., sensitivities of one or more locations in the geographical area to a weather condition in the geographical area), in accordance with at least one embodiment.

FIG. 7 illustrates an example of a user-interface 700 displaying the map of the geographical area overlaid with the first layer (i.e., the sensitivities of the one or more locations in the geographical area to the weather condition in the geographical area), in accordance with at least one embodiment.

As shown in FIG. 7, the user-interface 700 depicts the map of the geographical area, which includes various locations (represented as circles) such as locations 702*a*-702*z*. In an embodiment, the transportation network may correspond to the public transit system of the geographical area. In such a scenario, the various locations such as the location 702*a*-702*z* may correspond to one or more bus stops, one or more tramway stations, one or more train stations, or one or more metro stations in the geographical area. In an embodiment, different types of public transit systems may simultaneously service the one or more locations. For example, the location 702*c* may include a bus stop as well as a metro station. Thus, one or more buses and one or more metros may simultaneously service the location 702*c*.

Further, FIG. 7 depicts the sensitivity of each location in the geographical area to a particular parameter associated with the weather condition in the geographical area for the predetermined time-period. As shown in FIG. 7, the sensitivity of each location is represented using the size of the circle denoting the respective location. For instance, as depicted in a legend 704 in the map, locations denoted by a large circle have a high sensitivity to a particular parameter of the weather condition, which is being presented through the first layer (e.g., snowfall precipitation). For example, as shown in FIG. 7, the locations 702*b*, 702*c*, 702*d*, 702*h*, 702*k*, 702*o*, 702*r*, and 702*y* are highly sensitive towards the parameter of the weather condition currently being presented through the first layer (i.e., snowfall precipitation). Similarly, locations denoted by a small circle have a lesser sensitivity to that particular parameter of the weather condition (i.e., snowfall precipitation). For example, as shown in FIG. 7, the locations 702*e*, 702*l*, 702*m*, 702*s*, 702*t*, and 702*u* have a low sensitivity towards the particular parameter of the weather condition (i.e., snowfall precipitation). The determination of the sensitivity of the one or more locations to the one or more parameters of the weather condition has been explained further in conjunction with FIG. 3.

A person skilled in the art would appreciate the first layer may be overlaid on the map in various other ways without departing from the scope of the disclosure. For example, all locations may be denoted as circles of the same size. The value of sensitivity of each location may be represented using different colors filled within the respective circles denoting the locations. For instance, the circles denoting locations with high sensitivity may be filled with red color, while circles denoting locations with lesser sensitivity may be filled with green color, and so on. Further, a person skilled in the art would appreciate that the scope of the disclosure is not limited to displaying only one parameter associated with the weather condition, as the first layer overlaid on the map. In an embodiment, multiple parameters associated with the weather condition may be displayed simultaneous within the first layer (or as separate layers) overlaid on the map. For example, the sensitivity of the locations to snowfall may be represented by the size of the circles denoting the locations, while the sensitivity of the locations to rainfall may be represented by the color filled within the circles denoting the locations, and so on.

Further, in an embodiment, through the user-interface 700, the user may select a parameter from the one or more parameters of the weather condition (selection of the parameter of the weather condition has not depicted in the user-interface 700). Thereafter, the processor 202 may display the sensitivity of the one or more locations 702a-702z to the selected parameter of weather condition as the first layer overlaid on the map. For example, if the user selects rainfall precipitation, the processor 202 may display the sensitivity of the one or more locations 702a-702z to the rainfall precipitation in the geographical area for the predetermined time-period. A person skilled in the art would appreciate that in a scenario where sensitivity of the one or more locations 702a-702z to multiple parameters of the weather condition may be represented as the first layer, the user may select such multiple parameters of the weather condition instead of selecting a single parameter of the weather condition.

Thus, a visualization as presented by the user-interface 700 may help the user understand a geographical distribution of sensitivities to the weather condition in the geographical area. By viewing the visualization presented by the user-interface 700, the user may identify locations that are most affected by a parameter of weather condition (e.g., snowfall precipitation, rainfall precipitation, etc.). Further, such identified locations may then be made more robust by allocating more resources (such as vehicles, drivers, etc.) for the location and improving an existing transportation infrastructure.

Figure 8:
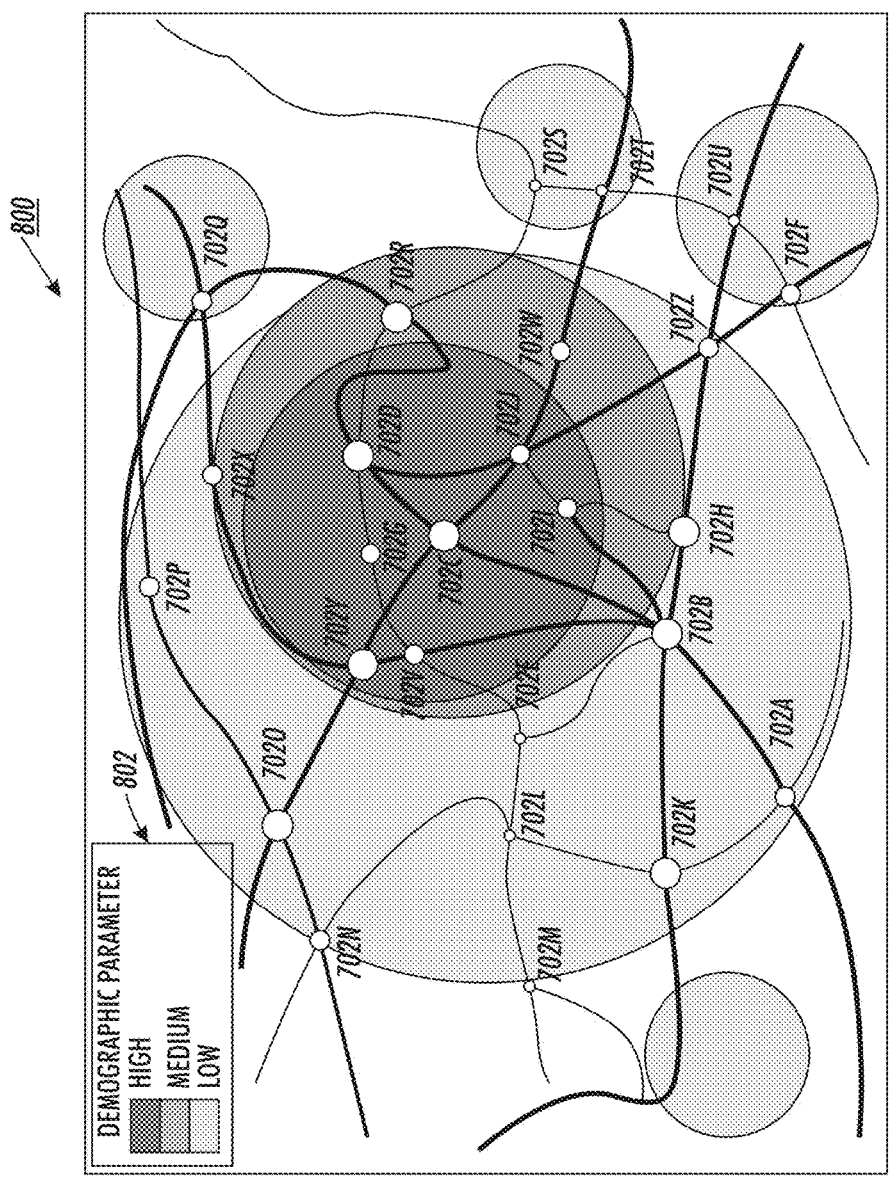
FIG. 8 illustrates an example of a user-interface displaying a map of a geographical area overlaid with a first layer (representing sensitivities of one or more locations in the geographical area to a weather condition in the geographical area) and a second layer (representing one or more demographic parameters associated with the one or more locations in the geographical area), in accordance with at least one embodiment.

FIG. 8 illustrates an example of a user-interface 800 displaying the map overlaid with the first layer (representing the sensitivities of the one or more locations in the geographical area to the weather condition in the geographical area) and the second layer (representing the one or more demographic parameters associated with the one or more locations in the geographical area), in accordance with at least one embodiment.

The user-interface 800 depicted in FIG. 8 includes the map of the geographical area. Similar to FIG. 7, the user-interface 800 depicts the first layer overlaid on the map. Thus, as discussed above, the sensitivity of each location in the geographical area to the particular parameter associated to the weather condition is represented as the first layer overlaid on the map. For instance, the size of the circles denoting each locations represent the sensitivity of the location to the particular parameter of weather condition. Further, in addition to the first layer, the user-interface 800 depicts the second layer overlaid on the map. The second layer represents a particular demographic parameter associated with the geographical area. For instance, as depicted by a legend 802 in the map, various values of the demographic parameter being represented as the second layer (e.g., population density) are shown with various fill colors/patterns. For example, as shown in FIG. 8, the locations such as 702c, 702d, 702y, etc. have a high value of the demographic parameter under consideration (e.g., population density). Similarly, the locations such as 702k, 702a, 702b, 702o, 702n, etc. have a low value of the demographic parameter under consideration.

A person skilled in the art would appreciate the second layer may be overlaid on the map in various other ways without departing from the scope of the disclosure. In an embodiment, through the user-interface 800, the user may select a demographic parameter, which is to be represented as the second layer (selection of the demographic parameter has not depicted in the user-interface 800). Further, a person skilled in the art would appreciate that the scope of the disclosure is not limited to displaying only one demographic parameter, as the second layer overlaid on the map. In an embodiment, multiple demographic parameters may be displayed simultaneously within the second layer (or as separate layers) overlaid on the map. In such a scenario, in an embodiment, the user may select such multiple demographic parameters, which are to be represented as the second layer.

Thus, a visualization as presented by the user-interface 800 may help the user infer valuable insights pertaining to the operational efficiency of the transportation network by correlating the geographical spread of the sensitivities to the weather condition to the demographic parameters of the geographic area. Based on such insights, the user may identify locations of interest within the geographical area, which do not conform to a general trend. For example, by inspection of the map presented in the user-interface 800, the user may infer that highly populated areas (e.g., city centers, commercial hubs, etc.) of the geographical area may be less sensitive towards snowfall precipitation in the geographical area. Further, the user may infer that the locations with a lower population density (e.g., suburbs, countryside, etc.) in the geographical area may be highly sensitive towards snowfall precipitation. However, there may be certain locations, which may deviate from the aforementioned inference. For example, the locations 702k and 702o may have a lower population density and may still be highly sensitive to snowfall precipitation (assuming that the first layer represents "sensitivity to snowfall precipitation" and the second layer represents the demographic parameter "population density" in FIG. 8).

Figure 9:
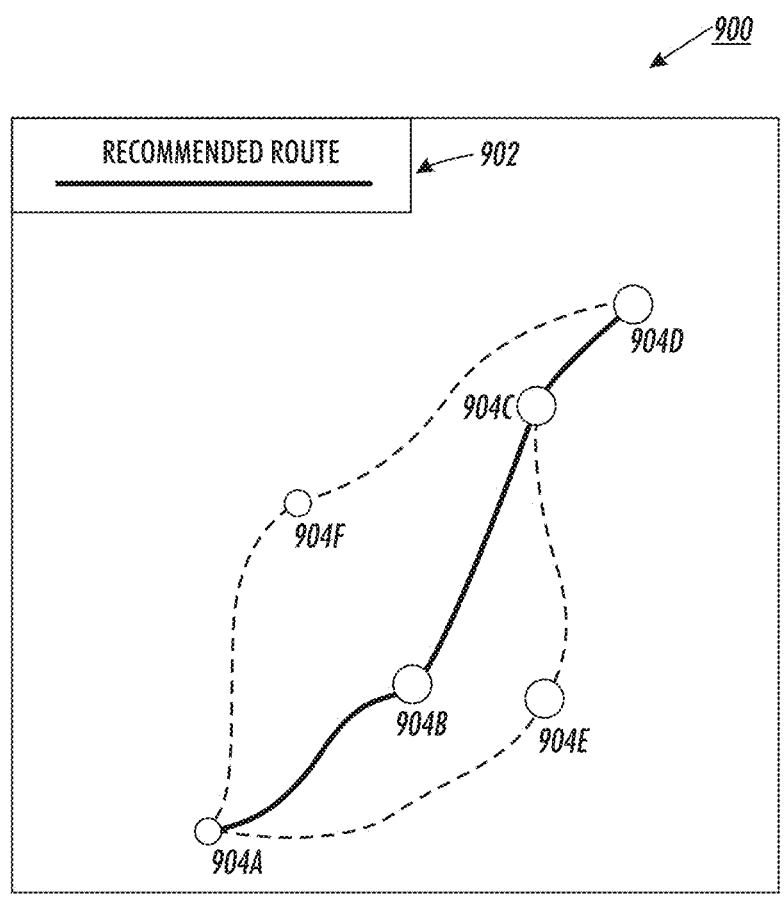
FIG. 9 illustrates an example of a user-interface displaying a recommended route from one or more routes between a first location and a second location in a geographical area, in accordance to at least one embodiment.

FIG. 9 illustrates an example of a user-interface 900 displaying the recommended route from the one or more routes between the first location and the second location in the geographical area, in accordance to at least one embodiment.

As shown in FIG. 9, the user-interface 900 depicts various locations (e.g., 904A-904F) in the geographical area through a map of the geographical area. For instance, the first location may correspond to the location 904A, while the second location may correspond to the location 904D. The various routes between the locations 904A and 904D may include 904A→904B→904C→904D, 904A→904E→904C→904D, and 904A→904F→904D. As shown in a legend 902, solid lines indicates the recommended route, while dotted/dashed lines indicate the remaining of the one or more routes between the first and the second locations. Thus, the recommended route between the locations 902A and 902D may be 904A→904B→904C→904D.

A person skilled in the art would appreciate that through the user-interface 900, the user may select the first location and the second location (selection of the first and the second locations has not depicted in the user-interface 900). Thereafter, the processor 202 may depict the recommended route from the one or more routes between the first and the second locations in the user-interface 900. The recommendation of the route based on the sensitivity of the one or more routes to the one or more parameters of the weather condition and the current weather condition has been explained further in conjunction with FIG. 5.

A person skilled in the art would appreciate that the examples of the user-interfaces 700, 800, and 900 are for illustrative purposes and should not be construed to limit the scope of the disclosure.

The disclosed embodiments encompass numerous advantages. The disclosure provides for the determination of the effect of the weather condition of the geographical area on the transportation network of the geographical area. As discussed above, the disclosure provides for an aggregation of data from various sources such as, the GPS/timestamp data from the one or more vehicles of the transportation network, the one or more parameters related to the weather condition from the Weather/Meteorological department, and the one or more demographic parameters from the Population Census organization. The collected data is correlated, analyzed, and visually presented on the map of the geographical area to aid in diagnosing problems of the transportation network. For example, the delay from the scheduled time of arrival of the one or more vehicles at the one or more locations is determined based on the GPS/timestamp data. The delay is correlated to the one or more parameters of the weather condition to determine the sensitivity of each location to the weather condition of the geographical area. The sensitivity of each location is overlaid on the map of the geographical area as the first layer. In addition, the geographical spread of the values of the one or more demographic parameters in the geographical area is displayed as the second layer overlaid on the map. Such a visualization of the sensitivities of the one or more locations and the demographic parameters at the one or more locations may help in diagnosing bottlenecks and identifying locations that are prone to excessive delays. Such locations may then be made more robust to weather related delays by improving transportation infrastructure in and around the location and/or deploying additional vehicles to service the identified locations.

Further, the disclosure provides for recommendation of routes between two or more locations in the geographical locations based on the sensitivity of the routes in the transportation network to weather conditions and the current weather condition in the geographical area. For example, when the current weather condition indicates heavy snowfall, the processor 202 may recommend a route between a first location and a second location, which has a least sensitivity to snowfall. However, in case of the current weather indicating no snowfall, the processor 202 may recommend a shortest route (irrespective of the route's sensitivity to snowfall) between the first and the second locations. Based on such recommendation of routes, the one or more vehicles in the transportation network may navigate through routes that are ideal with respect to the current weather conditions.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for determining an effect of a weather condition on a transportation network of a geographical area have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A system for determining an effect of a weather condition on a transportation network, the system comprising:

a transceiver configured to:
receive one or more parameters of said weather condition in one or more locations of a geographical area for time intervals for a predetermined time-period, and
receive global positioning system (GPS) data comprising actual arrival times of one or more vehicles, associated with said transportation network, at said one or more location of said geographical area for said time intervals; and one or more processors configured to:
determine a delay from a scheduled time of arrival of said one or more vehicles relative to said actual arrival time at said one or more locations for each of said time intervals;
convert, for each of said time intervals, said delay at said one or more locations into a first discrete binary value that represents a presence or absence of said delay;
convert, for each of said time intervals, said one or more parameters of said weather condition at said one or more locations into a second discrete binary value that represents a presence or absence of said weather condition;
apply a mutual information based correlation technique to said first discrete binary values and said second discrete binary values of the predetermined time-period, wherein said application of said mutual information based correlation technique determines a sensitivity of said one or more locations to said weather condition;
display, through a user interface, said sensitivity of said one or more locations as a first layer overlaid on a map of said geographical area; and
adjust a travel route of one or more vehicles in said transportation network based at least partially on said sensitivity of said one or more locations.

2. The system of claim 1, wherein said transceiver is further configured to receive one or more demographic parameters associated with said geographical area for said predetermined time-period.

3. The system of claim 2, wherein said one or more demographic parameters comprise at least one of a population distribution, an income distribution, one or more business districts/households, one or more city centers, or one or more suburbs.

4. The system of claim 3, wherein said one or more processors are further configured to display, through said user interface, said one or more demographic parameters as a second layer overlaid on said first layer on said map.

5. The system of claim 1, wherein said one or more parameters of said weather condition comprise at least one of a snowfall precipitation, a rainfall precipitation, a temperature, a wind speed, or an air pressure.

6. The system of claim 1, wherein said transportation network corresponds to a public transit system of said geographical area, wherein said one or more vehicles of said transportation network correspond to one or more buses, one or more trams, one or more trains, or one or more metros of said public transit system.

7. The system of claim 1, wherein said GPS data comprises time-stamped GPS coordinates of said one or more vehicles for said predetermined time-period.

8. The system of claim 7, wherein said delay is determined based on said time-stamped GPS coordinates.

9. A method for determining an effect of a weather condition on a transportation network, the method comprising:

receiving, by a transceiver, one or more parameters of said weather condition in one or more locations of a geographical area for time intervals for a predetermined time-period;
receiving global positioning system (GPS) data comprising actual arrival times of one or more vehicles, associated with said transportation network, at said one or more location of said geographical area for said time intervals;
determining, by one or more processors, a delay from a scheduled time of arrival of said one or more vehicles relative to said actual arrival time at said one or more locations for each of said time intervals;
converting, for each of said time intervals, said delay at said one or more locations into a first discrete binary value that represents a presence or absence of said delay;
converting, for each of said time intervals, said one or more parameters of said weather condition at said one or more locations into a second discrete binary value that represents a presence or absence of said weather condition;
applying, by said one or more processors, a mutual information based correlation technique to said first discrete binary values and said second discrete binary values of the predetermined time-period, wherein said application of said mutual information based correlation technique determines a sensitivity of said one or more locations to said weather condition;
displaying, through a user interface, by said one or more processors, said sensitivity of said one or more locations as a first layer overlaid on a map of said geographical area; and
adjusting a travel route of one or more vehicles in said transportation network based at least partially on said sensitivity of said one or more locations.

10. The method of claim 9, further comprising receiving, by said transceiver, one or more demographic parameters associated with said geographical area for said predetermined time-period.

11. The method of claim 10, wherein said one or more demographic parameters comprise at least one of a population distribution, an income distribution, one or more business districts/households, one or more city centers, or one or more suburbs.

12. The method of claim 11, further comprising displaying, through said user interface, by said one or more processors, said one or more demographic parameters as a second layer overlaid on said first layer on said map.

13. The method of claim 9, wherein said one or more parameters of said weather condition comprise at least one of a snowfall precipitation, a rainfall precipitation, a temperature, a wind speed, or an air pressure.

14. The method of claim 9, wherein said transportation network corresponds to a public transit system of said geographical area, wherein said one or more vehicles of said transportation network correspond to one or more buses, one or more trams, one or more trains, or one or more metros of said public transit system.

15. The method of claim 9, wherein said GPS data comprises time-stamped GPS coordinates of said one or more vehicles for said predetermined time-period.

16. The method of claim 15, wherein said delay is determined based on said time-stamped GPS coordinates location.

17. A computer program product for use with a computing device, the computer program product comprising a non-transitory computer readable medium, the non-transitory computer readable medium stores a computer program code for determining an effect of a weather condition on a transportation network, the computer program code is executable by one or more processors in the computing device to:
receive, by a transceiver, one or more parameters of said weather condition in one or more locations of a geographical area for time intervals for a predetermined time-period, and
receive, by a transceiver, global positioning system (GPS) data comprising actual arrival times of one or more vehicles, associated with said transportation network, at said one or more location of said geographical area for said time intervals;
determine, by said one or more processors, a delay from a scheduled time of arrival of said one or more vehicles relative to said actual arrival time at said one or more locations for each of said time intervals;
apply, by said one or more processors, a mutual information based correlation technique to said first discrete binary values and said second discrete binary values of the predetermined time-period, wherein said application of said mutual information based correlation technique determines a sensitivity of said one or more locations to said weather condition;
display, through a user interface, by said one or more processors, said sensitivity of said one or more locations as a first layer overlaid on a map of said geographical area; and
adjust a travel route of one or more vehicles in said transportation network based at least partially on said sensitivity of said one or more locations.

18. The computer program product of claim 17, wherein said computer program code is further executable by said one or more processors to display, through said user interface, one or more demographic parameters associated with said geographical area for said predetermined time-period as a second layer overlaid on said first layer on said map.

19. The computer program product of claim 17, wherein said GPS data comprises time-stamped GPS coordinates of said one or more vehicles for said predetermined time-period, wherein said delay is determined based on said time-stamped GPS coordinates.

* * * * *